United States Patent
Ricciuti et al.

(10) Patent No.: US 8,519,290 B2
(45) Date of Patent: Aug. 27, 2013

(54) NON-HOMOGENEOUS CAM, AND OPERATING MECHANISM AND ELECTRICAL SWITCHING APPARATUS INCLUDING THE SAME

(75) Inventors: Anthony T. Ricciuti, Bethel Park, PA (US); Daniel E. Palmieri, Coraopolis, PA (US); Patrick C. Wolfe, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 147 days.

(21) Appl. No.: 13/331,447

(22) Filed: Dec. 20, 2011

(65) Prior Publication Data
US 2013/0153384 A1    Jun. 20, 2013

(51) Int. Cl.
*H01H 3/42* (2006.01)

(52) U.S. Cl.
USPC ............... 200/574; 200/400; 335/6; 335/64

(58) Field of Classification Search
USPC .................. 200/574, 468, 329, 337, 400
See application file for complete search history.

(56) References Cited

U.S. PATENT DOCUMENTS

| | | | |
|---|---|---|---|
| 4,406,446 A * | 9/1983 | Lind | 269/152 |
| 4,743,876 A * | 5/1988 | Milianowicz et al. | 335/20 |
| 6,472,627 B1 * | 10/2002 | Yoon | 200/400 |
| 7,186,937 B1 * | 3/2007 | Ricciuti et al. | 200/400 |
| 7,368,677 B2 * | 5/2008 | Jones et al. | 200/400 |
| 7,557,682 B2 | 7/2009 | Ricciuti et al. | |

* cited by examiner

*Primary Examiner* — Kyung Lee
(74) *Attorney, Agent, or Firm* — Eckert Seamans Cherin & Mellott, LLC; Kirk D. Houser

(57) ABSTRACT

A non-homogeneous cam includes an eccentric disk having side surfaces with an opening therethrough, and a cam surface disposed between the side surfaces. A first radius extending from a point within the opening to a number of first portions of the cam surface and second radii extending from the point to second portions of the cam surface define the cam surface. The first radius is greater than each of the second radii. The cam surface includes a first cam surface generally having the first radius and a second cam surface having a plurality of the second radii. The first and second cam surfaces define an angle of less than 90 degrees. The eccentric disk is generally made of a first material having a first strength. A portion of the eccentric disk between the first and second cam surfaces is made of a different second material having a greater second strength.

20 Claims, 6 Drawing Sheets

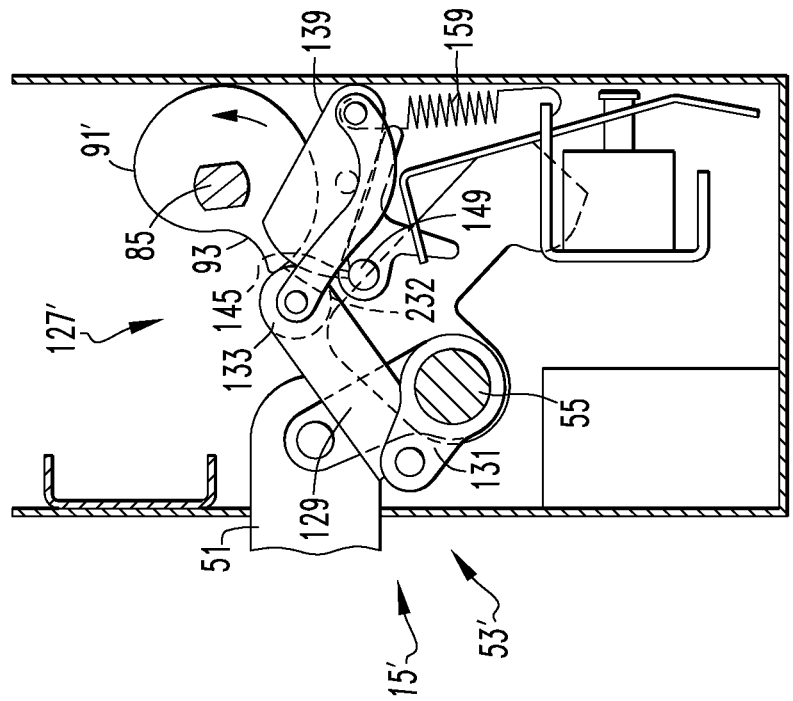
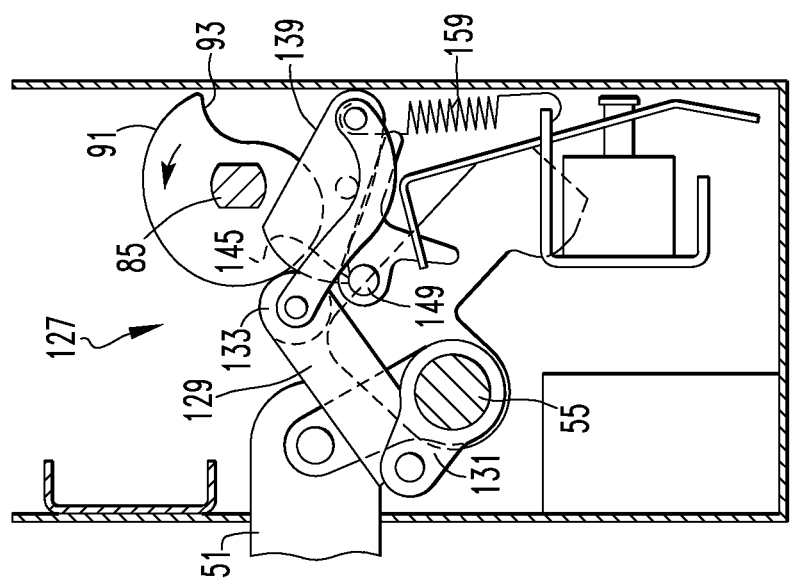
FIG.3D
FIG.3C
PRIOR ART

US 8,519,290 B2

NON-HOMOGENEOUS CAM, AND OPERATING MECHANISM AND ELECTRICAL SWITCHING APPARATUS INCLUDING THE SAME

BACKGROUND

1. Field

The disclosed concept pertains generally to electrical switching apparatus and, more particularly, to, for example, circuit breakers. The disclosed concept further pertains to operating mechanisms for opening separable contacts. The disclosed concept still further pertains to cams, such as for example, for a coupling mechanism of an operating mechanism.

2. Background Information

Medium voltage circuit breakers include, for example and without limitation, a plurality of separable contacts coupled to an operating mechanism having a common spring-operated closing and tripping device. The operating mechanism includes one or more opening springs which separate the contacts and a pair of closing springs which close the contacts as well as charge the opening spring(s). The separable contacts are closed by releasing the energy stored in the closing springs through activation of a closing trigger mechanism. This can be done manually or remotely through a solenoid. The closing springs are charged manually by a lever arm through a ratchet coupling, or, more preferably, by a motor. An electronic trip circuit monitors the load currents and actuates an opening trigger mechanism through an opening solenoid if a load current exceeds certain current-time characteristics.

As shown in FIGS. 1 and 2, a switch gear apparatus 10 includes a cabinet or enclosure 13 for enclosing a circuit breaker 15. The example circuit breaker 15 is, preferably, a draw-out three-phase vacuum circuit interrupter having controls on a front panel 17 for manually operating the circuit breaker 15. The circuit breaker 15 has wheels 19 which engage rails 21 for inserting the circuit breaker 15 into and removing the circuit breaker 15 from the enclosure 13. The enclosure 13 includes at least one line terminal 27 and at least one load terminal 29. The circuit breaker 15 includes at least one line terminal 23 and at least one load terminal 25. Typically, the switch gear apparatus 10 has three circuit breaker line and load terminals 23, 25 and three corresponding enclosure line and load terminals 27, 29. The circuit breaker line and load terminals 23, 25 are positioned to engage, and be electrically coupled to, the enclosure line and load terminals 27, 29. Movement of the circuit breaker 15 along the rails 21 also effects connection and disconnection of the circuit breaker line and load terminals 23, 25 with the enclosure line and load terminals 27, 29. While a medium voltage vacuum interrupter is shown for the circuit breaker 15, the disclosed concept is also applicable for use with air circuit breakers.

Referring to FIGS. 3A-3C, fixed on a crank shaft 85 (also shown in FIG. 2) between supports 87, 89 (FIG. 2) is a closing cam 91, which includes a notch 93 in a peripheral cam surface thereof. A main link roller 133 engages the peripheral cam surface of the closing cam 91 which, as the crank shaft 85 rotates, pushes on main links 129 (only one link is shown) to rotate a pole shaft 55 through the eccentricity in the closing cam 91 peripheral cam surface. A trip latch reset spring 159 biases the main link roller 133 against the peripheral cam surface of the closing cam 91 until it falls into the notch 93 with the closing springs 69, 71 (FIG. 2) latched in the charged condition. This permits the trip latch reset spring 159 to rotate a hatchet 139 counter-clockwise (with respect to FIGS. 3A-3C) to the latched position in which a latch edge 145 is engaged by a D-shaft 149 as shown in FIGS. 3B and 3C. When a closing spring release (not shown) is actuated, the closing springs 69, 71 rapidly rotate the crank shaft 85. The increasing effective diameter of the closing cam 91 produced by the eccentricity of the cam 91 surface, pushes the main links 129 downward (with respect to FIG. 3B) and to the position shown in FIG. 3C. This rotates the pole shaft 55 in a counterclockwise direction (with respect to FIG. 3C) to drive a push rod 51 to the left (with respect to FIG. 3C) to close separable contacts 40 (FIG. 1) while, as can be seen in FIG. 3C, the hatchet 139 remains engaged by the D-shaft 149.

As a relatively high latch load force is rotated around the cam 91, the affect on the cam material changes with the thickness (as measured in the plane of FIGS. 3A-3C) of the cam 91. At the thinnest point, which is proximate the notch 93, the cam 91 may have insufficient strength to withstand the load. The cam 91 shown in FIG. 2 includes four laminations.

There is room for improvement in cams.

There is also room for improvement in operating mechanisms.

There is further room for improvement in electrical switching apparatus, such as circuit breakers.

SUMMARY

These needs and others are met by embodiments of the disclosed concept, which localizes a relatively higher strength material at a thinnest point of a cam, in order to provide sufficient strength to withstand a load. This improves performance while minimizing costs.

In accordance with one aspect of the disclosed concept, a non-homogeneous cam comprises: an eccentric disk comprising: two side surfaces having an opening extending therethrough, and a cam surface disposed between the two side surfaces, wherein the cam surface is defined by a first radius extending from a point within the opening to a number of first portions of the cam surface and by a plurality of second radii extending from the point within the opening to a plurality of second portions of the cam surface; wherein the first radius is greater than each of the second radii, wherein the cam surface comprises a first cam surface generally having the first radius and a second cam surface having a plurality of the plurality of second radii, wherein the first cam surface and the second cam surface define an angle of less than 90 degrees, wherein the eccentric disk is generally made of a first material having a first strength, and wherein a portion of the eccentric disk between the first cam surface and the second cam surface is made of a different second material having a second strength greater than the first strength.

As another aspect of the disclosed concept, an operating mechanism for opening and closing separable contacts comprises: a coupling mechanism comprising a non-homogeneous cam comprising: an eccentric disk comprising: two side surfaces having an opening extending therethrough, and a cam surface disposed between the two side surfaces, wherein the cam surface is defined by a first radius extending from a point within the opening to a number of first portions of the cam surface and by a plurality of second radii extending from the point within the opening to a plurality of second portions of the cam surface; wherein the first radius is greater than each of the second radii, wherein the cam surface comprises a first cam surface generally having the first radius and a second cam surface having a plurality of the plurality of second radii, wherein the first cam surface and the second cam surface define an angle of less than 90 degrees, wherein the eccentric disk is generally made of a first material having a first strength, and wherein a portion of the eccentric disk between the first cam surface and the second cam surface is made of a different second material having a second strength greater than the first strength.

As another aspect of the disclosed concept, an electrical switching apparatus comprises: separable contacts; and an operating mechanism structured to open and close the separable contacts, the operating mechanism comprising: a crank shaft, a pole shaft, and a coupling mechanism coupling the crank shaft to the pole shaft, the coupling mechanism comprising: a non-homogeneous closing cam fixed on the crank shaft, the closing cam comprising: an eccentric disk comprising: two side surfaces having an opening extending therethrough, and a cam surface disposed between the two side surfaces, wherein the cam surface is defined by a first radius extending from a point within the opening to a number of first portions of the cam surface and by a plurality of second radii extending from the point within the opening to a plurality of second portions of the cam surface; wherein the first radius is greater than each of the second radii, wherein the cam surface comprises a first cam surface generally having the first radius and a second cam surface having a plurality of the plurality of second radii, wherein the first cam surface and the second cam surface define an angle of less than 90 degrees, wherein the eccentric disk is generally made of a first material having a first strength, and wherein a portion of the eccentric disk between the first cam surface and the second cam surface is made of a different second material having a second strength greater than the first strength.

BRIEF DESCRIPTION OF THE DRAWINGS

A full understanding of the disclosed concept can be gained from the following description of the preferred embodiments when read in conjunction with the accompanying drawings in which:

FIG. 3C is similar to FIGS. 3A and 3B but showing the circuit breaker coupling mechanism in a position in which the separable contacts are closed and the closing springs are discharged.

FIG. 3D shows a circuit breaker coupling mechanism including a non-homogeneous cam in accordance with the disclosed concept in a position in which the separable contacts are closed and the closing springs are charged.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a medium voltage circuit breaker, although the disclosed concept is applicable to a wide range of electrical switching apparatus.

Figure 1:
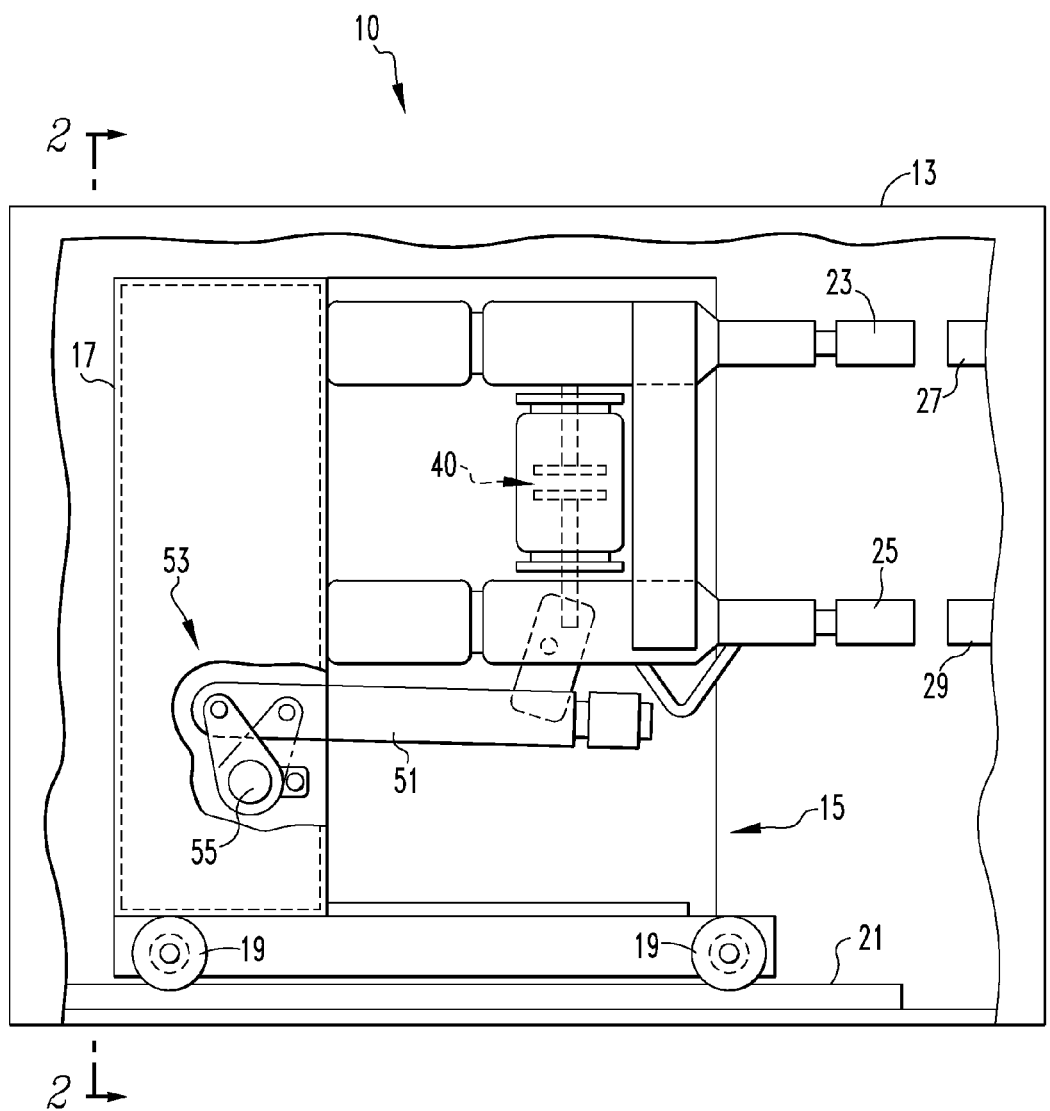
FIG. 1 is a side elevational view with some parts cut away of a medium voltage circuit breaker shown in the disconnected position.
Figure 2:
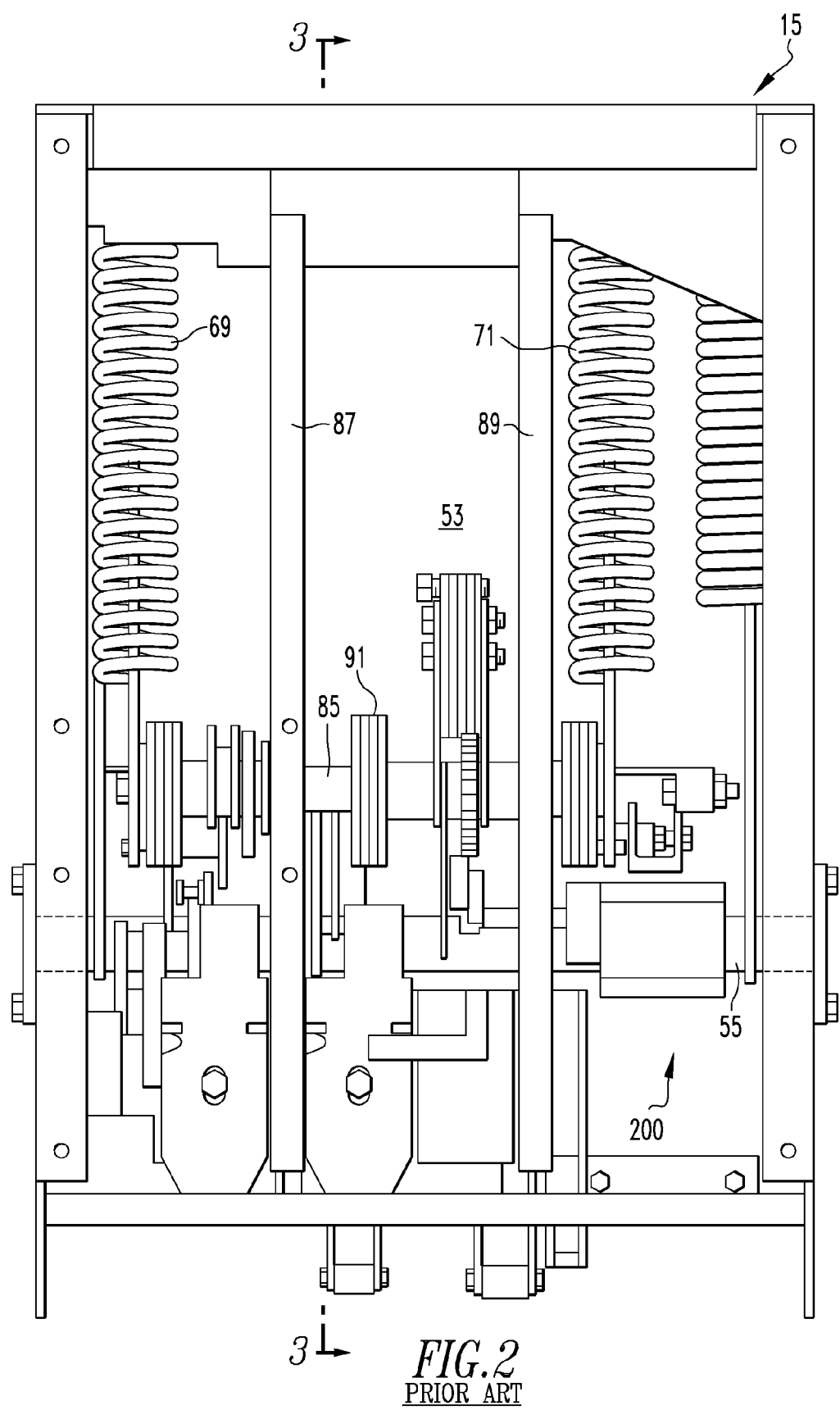
FIG. 2 is a front elevational view of the medium voltage circuit breaker of FIG. 1 with the cover removed.
Figure 3A:
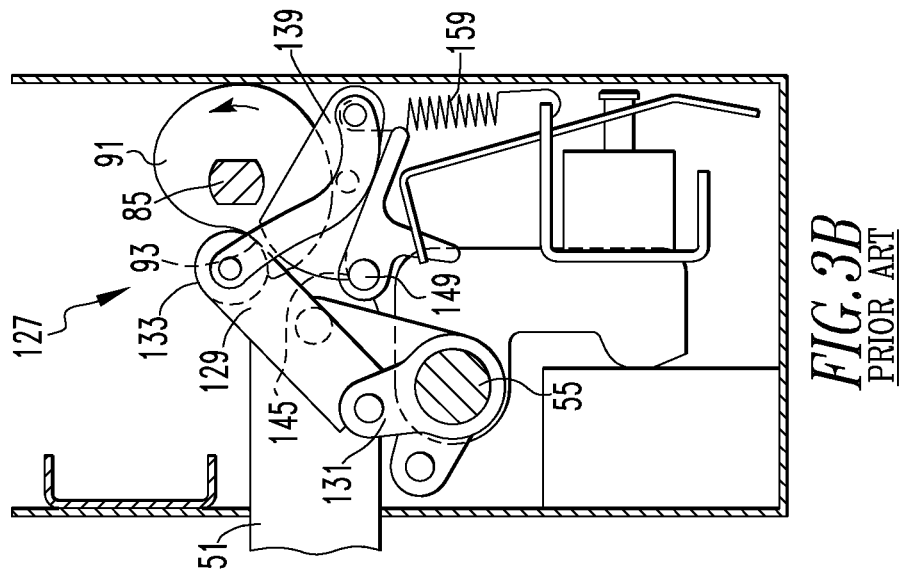
FIG. 3A is a sectional view taken along the line 3-3 in FIG. 2 showing a circuit breaker coupling mechanism in a position in which the separable contacts are open and the closing springs are discharged.

Referring to FIG. 3D, a circuit breaker coupling mechanism 127' in accordance with the disclosed concept is shown in a position in which the separable contacts 40 (FIG. 1) are closed and the closing springs 69, 71 (FIG. 2) are charged. The circuit breaker 15 of FIGS. 1, 2 and 3A-3C is disclosed by U.S. Pat. No. 7,557,682, which is incorporated by reference herein.

Figure 3B:
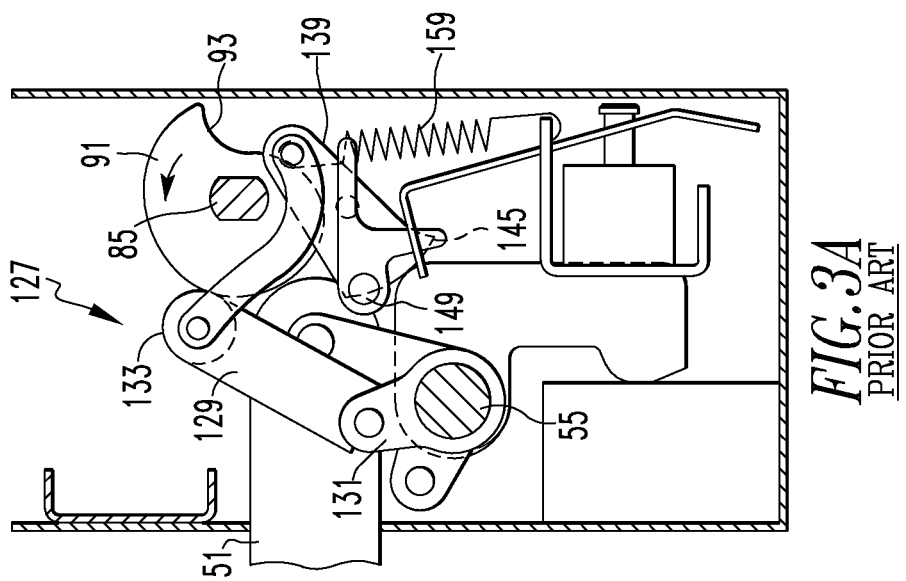
FIG. 3B is similar to FIG. 3A but showing the circuit breaker coupling mechanism in a position in which the separable contacts are open and the closing springs are charged.

The coupling mechanism 127' is the same as the coupling mechanism 127 of FIGS. 3A-3C except that a main non-homogeneous closing cam 91' (best shown in FIGS. 4 and 5) is employed in place of the closing cam 91 of FIGS. 3A-3C. FIG. 3D shows the position of the coupling mechanism 12T in which the latch load force on the thinnest outside area 202 (shown in cross hatch in FIGS. 4 and 5) of the cam 91' is the greatest. Operation of the charging mechanism 200 (FIG. 2) rotates the crank shaft 85 in the counterclockwise direction with respect to FIG. 3C (shown with the prior cam 91) and FIG. 3D (shown with the main non-homogeneous closing cam 91') to charge the closing springs 69, 71 (FIG. 2).

Figure 4:
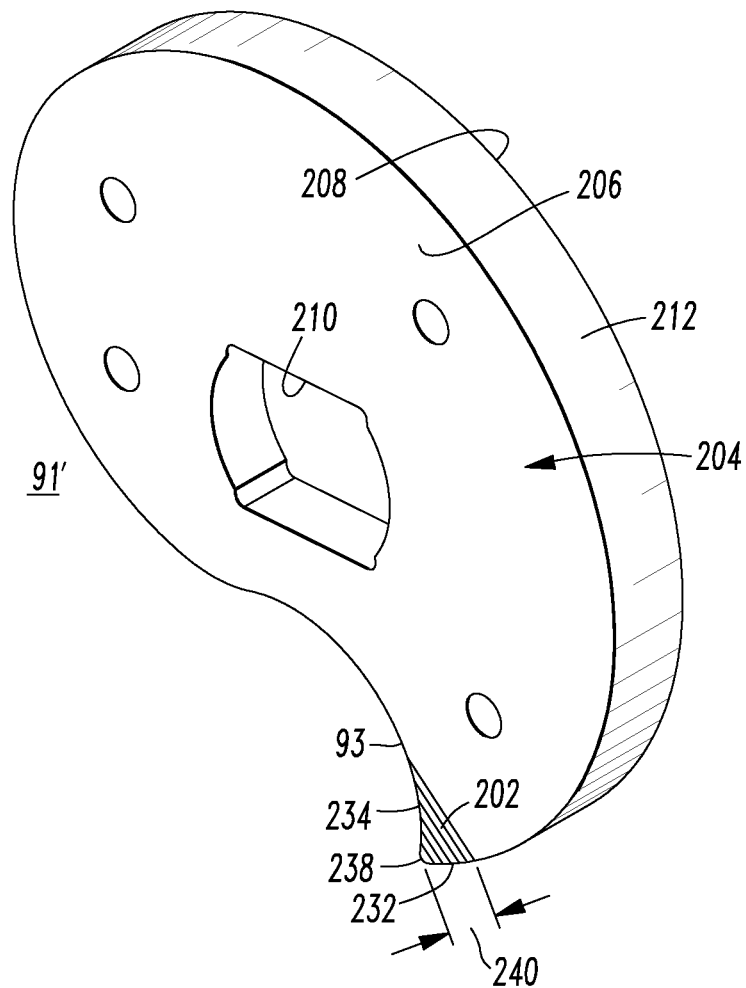
FIG. 4 is an isometric view of a main non-homogeneous closing cam in accordance with embodiments of the disclosed concept.
Figure 5:
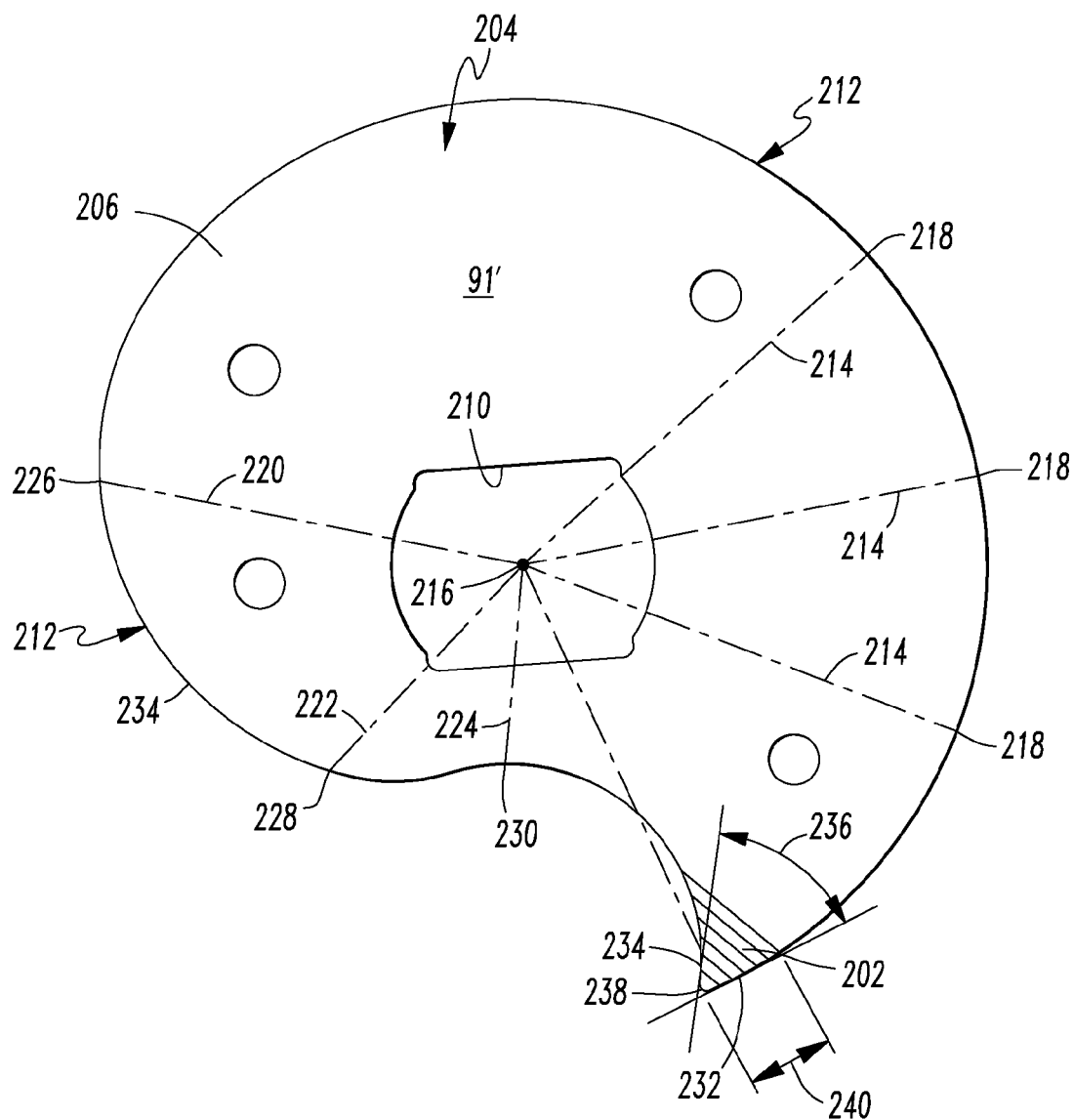
FIG. 5 is a side vertical elevation view of the main non-homogeneous closing cam of FIG. 4.

Referring to FIGS. 4 and 5, the example cam 91' includes an eccentric disk 204 having two side surfaces 206,208 with an opening 210 extending therethrough, and a cam surface 212 disposed between the two side surfaces 206,208. The cam surface 212 is defined (as shown in FIG. 5) by a first radius 214 extending from a point 216 within the opening 210 to a number of first portions 218 of the cam surface 212 and by a plurality of second radii, such as 220,222,224, extending from the point 216 within the opening 210 to a plurality of second portions 226,228,230 of the cam surface 212. The first radius 214 is greater than each of the second radii 220,222, 224. The cam surface 212 includes a first cam surface 232 generally having the first radius 214 and a second cam surface 234 having a plurality of the plurality of second radii 220, 222,224. The first cam surface 232 and the second cam surface 234 define an angle 236 of less than 90 degrees. The eccentric disk 204 is generally made of a first material having a first strength. A portion (e.g., at the thinnest outside area 202) of the eccentric disk 204 between the first cam surface 232 and the second cam surface 234 is made of a different second material having a second strength greater than the first strength.

EXAMPLE 1

The example main non-homogeneous closing cam 91' is manufactured with a suitable powdered metal process and is further manufactured with a copper infusion at the thinnest outside area 202 (shown in cross hatch in FIGS. 4 and 5). The cam 91' is a single, solid component which does not require laminations.

EXAMPLE 2

A typical "powdered metal" manufacturing process involves a mold (not shown) into which metallic powder (e.g., without limitation, steel metallic powder) is poured and then compressed to create a part (near "net-shape") (not shown)

that needs relatively very few secondary operations before becoming suitable for production (or net-shape). Upon removal, the part holds its shape sufficiently to be transferred to a furnace (not shown) where the part is heated to a specified temperature (or "sintering" temperature, which is below the melting point of the metallic powder), causing the compressed metallic powder to solidify. The resultant part (without a copper infusion at the thinnest outside area 202, but otherwise generally shown in FIGS. 4 and 5) has most of the qualities of solid metal, albeit a bit more porous.

After the sintering process, a copper form (not shown) is fitted around the part and the part is heated in a furnace (not shown) at a temperature below the sintering temperature of the metallic powder, but sufficiently high enough for copper from the copper form to infuse into the porous part. For the disclosed non-homogeneous cam 91', the copper form is about the tip 238 of the cam 91' at the example thinnest outside area 202 (shown in cross hatch in FIGS. 4 and 5).

EXAMPLE 3

The example copper infusion extends for a non-limiting example 0.3 inch depth 240 from the tip 238 of the cam 91'. This example depth 240 is selected because various geometrical analyses of circuit breaker mechanisms show that the roller 133 (FIG. 3D) may sit as far as about 0.3 inches from the cam tip 238 when the load is the greatest. Although the example depth 240 is disclosed, any suitable smaller or larger depth may be employed.

EXAMPLE 4

Copper for the example copper infusion is selected for its material properties and their relationship to the example steel metallic powder employed in the cam 91'.

EXAMPLE 5

Although examples are disclosed for the metallic powder and the infusion material, different cam powdered materials and different infusion materials can be employed.

EXAMPLE 6

The example non-homogeneous closing cam 91' further includes a notch 93 disposed proximate the second cam surface 234. Although an example cam profile is disclosed, variations of the profile of the example cam 91' are possible within the scope of the disclosed concept.

EXAMPLE 7

The first cam surface 232 and the second cam surface 234 generally define a portion at the example thinnest outside area 202, which is the thinnest portion of the eccentric disk 204. The example copper infusion at this portion of the eccentric disk 204 between the first cam surface 232 and the second cam surface 234 provides a different material having suitable strength to withstand the requisite load of FIG. 3D.

EXAMPLE 8

The tip 238 of the cam 91' is preferably a rounded point.

EXAMPLE 9

The example copper infusion extends from the rounded point of the cam tip 238 for about 0.3 inches along the first cam surface 232, along the second cam surface 234 and in the portion of the eccentric disk 204 between the first cam surface 232 and the second cam surface 234.

EXAMPLE 10

The eccentric disk 204 is generally made of a first material (e.g., steel) having a first strength. The second material at the example thinnest outside area 202 is made of a sintered steel powder infused with copper.

EXAMPLE 11

The coupling mechanism 127' of FIG. 3D includes the pair of links 129 (only one is shown) pivotally connected at the first ends thereof to the pole shaft 55 through a crank arm 131 and rotatably supporting the roller 133 between the free second ends thereof. Depending upon the position of the cam 91', one of the first cam surface 232 and the second cam surface 234 (FIGS. 4 and 5) engages the roller 133. Rotation of the crank shaft 85 causes a different portion of the second cam surface 234 or the first cam surface 232 to engage the roller 133, which pushes on the pair of links 129 to rotate the pole shaft 55 to close (FIGS. 3C and 3D) the separable contacts 40 (FIG. 1).

EXAMPLE 12

The electrical switching apparatus 15' of FIG. 3D can be a medium voltage vacuum circuit interrupter, such as a medium voltage vacuum circuit breaker. The electrical switching apparatus 15' can be similar to the circuit breaker 15 of FIGS. 1, 2 and 3A-3C except for the operating mechanism 53' and coupling mechanism 127', which include the example main non-homogeneous closing cam 91' disclosed herein.

EXAMPLE 13

The crank shaft 85 is further rotated (as shown between FIGS. 3C and 3D) to extend or charge the number of closing springs 69, 71 by the charging mechanism 200 (FIG. 2).

EXAMPLE 14

As shown in FIG. 3D, a portion of the first cam surface 232 proximate the portion (e.g., at the thinnest outside area 202 (FIGS. 4 and 5)) of the eccentric disk 204 (FIGS. 4 and 5) between the first cam surface 232 and the second cam surface 234 (FIGS. 4 and 5) engages the roller 133.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A non-homogeneous cam comprising:
   an eccentric disk comprising:
      two side surfaces having an opening extending therethrough, and
      a cam surface disposed between the two side surfaces, wherein the cam surface is defined by a first radius extending from a point within the opening to a number of first portions of the cam surface and by a plurality of second radii extending from the point within the opening to a plurality of second portions of the cam surface;

wherein the first radius is greater than each of the second radii, wherein the cam surface comprises a first cam surface generally having the first radius and a second cam surface having a plurality of the plurality of second radii, wherein the first cam surface and the second cam surface define an angle of less than 90 degrees, wherein the eccentric disk is generally made of a first material having a first strength, and wherein a portion of the eccentric disk between the first cam surface and the second cam surface is made of a different second material having a second strength greater than the first strength.

2. The non-homogeneous cam of claim 1 wherein the first cam surface and the second cam surface generally define a portion having a thinnest portion of said eccentric disk; and wherein the different second material has the second strength to withstand a load.

3. The non-homogeneous cam of claim 1 wherein the eccentric disk is manufactured with a powdered metal process.

4. The non-homogeneous cam of claim 3 wherein the eccentric disk is further manufactured with a copper infusion at the portion of the eccentric disk between the first cam surface and the second cam surface.

5. The non-homogeneous cam of claim 1 wherein the first cam surface and the second cam surface define a rounded point.

6. The non-homogeneous cam of claim 5 wherein the different second material extends from the rounded point for about 0.3 inches along the first cam surface, along the second cam surface and in the portion of the eccentric disk between the first cam surface and the second cam surface.

7. The non-homogeneous cam of claim 1 wherein said eccentric disk further comprises a notch disposed proximate the second cam surface.

8. The non-homogeneous cam of claim 1 wherein the first material is made of steel; and wherein the second material is made of a sintered steel powder infused with copper.

9. An operating mechanism for opening and closing separable contacts, said operating mechanism comprising:
a coupling mechanism comprising a non-homogeneous cam comprising:
an eccentric disk comprising:
two side surfaces having an opening extending therethrough, and
a cam surface disposed between the two side surfaces,
wherein the cam surface is defined by a first radius extending from a point within the opening to a number of first portions of the cam surface and by a plurality of second radii extending from the point within the opening to a plurality of second portions of the cam surface;
wherein the first radius is greater than each of the second radii,
wherein the cam surface comprises a first cam surface generally having the first radius and a second cam surface having a plurality of the plurality of second radii,
wherein the first cam surface and the second cam surface define an angle of less than 90 degrees,
wherein the eccentric disk is generally made of a first material having a first strength, and
wherein a portion of the eccentric disk between the first cam surface and the second cam surface is made of a different second material having a second strength greater than the first strength.

10. The coupling mechanism of claim 9 wherein said non-homogeneous closing cam further comprises a notch disposed proximate the second cam surface.

11. The coupling mechanism of claim 9 wherein said coupling mechanism further comprises a pair of links pivotally connected at first ends thereof to a pole shaft through a crank arm and rotatably supporting a roller between free second ends thereof; and wherein one of the first cam surface and the second cam surface engages the roller.

12. The coupling mechanism of claim 9 wherein said coupling mechanism further comprises a pair of links pivotally connected at first ends thereof to a pole shaft through a crank arm and rotatably supporting a roller between free second ends thereof; wherein the second cam surface engages the roller; wherein rotation of a crank shaft causes a different portion of the second cam surface or the first cam surface to engage the roller, which pushes on the pair of links to rotate the pole shaft to close said separable contacts.

13. An electrical switching apparatus comprising:
separable contacts; and
an operating mechanism structured to open and close said separable contacts, said operating mechanism comprising:
a crank shaft,
a pole shaft, and
a coupling mechanism coupling the crank shaft to the pole shaft, said coupling mechanism comprising:
a non-homogeneous closing cam fixed on the crank shaft, said closing cam comprising:
an eccentric disk comprising:
two side surfaces having an opening extending therethrough, and
a cam surface disposed between the two side surfaces,
wherein the cam surface is defined by a first radius extending from a point within the opening to a number of first portions of the cam surface and by a plurality of second radii extending from the point within the opening to a plurality of second portions of the cam surface;
wherein the first radius is greater than each of the second radii,
wherein the cam surface comprises a first cam surface generally having the first radius and a second cam surface having a plurality of the plurality of second radii,
wherein the first cam surface and the second cam surface define an angle of less than 90 degrees,
wherein the eccentric disk is generally made of a first material having a first strength, and
wherein a portion of the eccentric disk between the first cam surface and the second cam surface is made of a different second material having a second strength greater than the first strength.

14. The electrical switching apparatus of claim 13 wherein said electrical switching apparatus is a medium voltage vacuum circuit interrupter.

15. The electrical switching apparatus of claim 13 wherein said electrical switching apparatus is a medium voltage vacuum circuit breaker.

16. The electrical switching apparatus of claim 13 wherein said operating mechanism further comprises a number of closing springs and a charging mechanism; and wherein said crank shaft is rotated to extend or charge the number of closing springs by the charging mechanism.

17. The electrical switching apparatus of claim 13 wherein said non-homogeneous closing cam further comprises a notch disposed proximate the second cam surface.

18. The electrical switching apparatus of claim 13 wherein said coupling mechanism further comprises a pair of links pivotally connected at first ends thereof to the pole shaft through a crank arm and rotatably supporting a roller between free second ends thereof; and wherein one of the first cam surface and the second cam surface engages the roller.

19. The electrical switching apparatus of claim 13 wherein said coupling mechanism further comprises a pair of links pivotally connected at first ends thereof to the pole shaft through a crank arm and rotatably supporting a roller between free second ends thereof; wherein a portion of the second cam surface engages the roller; wherein rotation of the crank shaft causes another portion of the second cam surface or the first cam surface to engage the roller, which pushes on the pair of links to rotate the pole shaft and close said separable contacts.

20. The electrical switching apparatus of claim 19 wherein said operating mechanism further comprises a number of closing springs and a charging mechanism; wherein further rotation of the crank shaft charges the number of closing springs by the charging mechanism; and wherein a portion of the first cam surface proximate said portion of the eccentric disk between the first cam surface and the second cam surface engages the roller.

\* \* \* \* \*